(12) United States Patent
Lapalme et al.

(10) Patent No.: US 10,699,514 B2
(45) Date of Patent: Jun. 30, 2020

(54) EDGE DISPLAY HAVING A LED MATRIX

(71) Applicant: BLUBERI GAMING CANADA INC., Drummondville (CA)

(72) Inventors: Andre Lapalme, Drummondville (CA); Yvan Paradis, Drummondville (CA); Eric Beaudoin, Drummondville (CA)

(73) Assignee: BLUBERI GAMING CANADA INC., Drummondville (CA)

( * ) Notice: Subject to any disclaimer, the term of this patent is extended or adjusted under 35 U.S.C. 154(b) by 0 days.

(21) Appl. No.: 16/150,531

(22) Filed: Oct. 3, 2018

(65) Prior Publication Data

US 2019/0102975 A1  Apr. 4, 2019

Related U.S. Application Data

(60) Provisional application No. 62/567,562, filed on Oct. 3, 2017.

(51) Int. Cl.

| | |
|---|---|
| *G07F 17/32* | (2006.01) |
| *G06F 3/044* | (2006.01) |
| *G06F 3/0354* | (2013.01) |
| *G06F 3/041* | (2006.01) |
| *G06F 3/039* | (2013.01) |
| *G07F 17/24* | (2006.01) |
| *H05K 5/00* | (2006.01) |

(52) U.S. Cl.
CPC ........ *G07F 17/3211* (2013.01); *G06F 3/0393* (2019.05); *G06F 3/03547* (2013.01); *G06F 3/044* (2013.01); *G06F 3/0414* (2013.01); *G06F 3/0416* (2013.01); *G07F 17/248* (2013.01); *G07F 17/3209* (2013.01); *G07F 17/3216* (2013.01); *G07F 17/3288* (2013.01); *H05K 5/0017* (2013.01)

(58) Field of Classification Search
CPC ............. G07F 17/3211; G07F 17/3216; H05K 5/0017
See application file for complete search history.

(56) References Cited

U.S. PATENT DOCUMENTS

| | | | |
|---|---|---|---|
| 7,253,821 B2 * | 8/2007 | Shimizu | ................. G09G 5/395 345/582 |
| 8,430,756 B2 | 4/2013 | McComb et al. | |
| 9,997,010 B2 | 6/2018 | Lee et al. | |
| 2004/0001335 A1 | 1/2004 | Wu | |

(Continued)

*Primary Examiner* — Justin L Myhr
(74) *Attorney, Agent, or Firm* — Benoit & Cote, Inc.; C. Marc Benoit

(57) ABSTRACT

An edge display on a gaming machine comprises a front display having a front surface and a side edge. The edge display comprises a mounting body having a lateral edge and a longitudinal surface extending in a longitudinal direction; and a lighting component mounted on the mounting body about the longitudinal surface. When the edge display is on the gaming machine, the lateral edge of the mounting body is contiguous with the side edge of the edge display and the longitudinal surface and the front surface are flush with each other whereby the edge display forms an extension of the front display. The edge display further provides an extension to the front display, whereby a first portion of a visual animation is sent to the front display and a second portion sent for display to the edge display to be displayed in a continuous fashion.

20 Claims, 13 Drawing Sheets

(56) References Cited

U.S. PATENT DOCUMENTS

| | | | |
|---|---|---|---|
| 2004/0166917 A1* | 8/2004 | Lam | G07F 17/3202 463/16 |
| 2006/0205498 A1* | 9/2006 | Kogo | A63F 13/08 463/30 |
| 2007/0010318 A1 | 1/2007 | Rigsby | |
| 2007/0149281 A1* | 6/2007 | Gadda | G07F 17/32 463/34 |
| 2008/0119288 A1 | 5/2008 | Rasmussen | |
| 2008/0136741 A1* | 6/2008 | Williams | G07F 17/32 345/3.3 |
| 2011/0109882 A1* | 5/2011 | Cove | G03B 21/10 353/30 |
| 2011/0118034 A1* | 5/2011 | Jaffe | G07F 17/3211 463/42 |
| 2011/0269543 A1* | 11/2011 | Johnson | G07F 17/3209 463/37 |
| 2012/0289335 A1* | 11/2012 | Kutomi | G07F 17/3211 463/33 |
| 2012/0300441 A1* | 11/2012 | Thomas | F21V 15/013 362/184 |
| 2012/0320075 A1* | 12/2012 | Silk | G06F 3/14 345/581 |
| 2016/0077270 A1* | 3/2016 | Komano | G02B 6/0028 349/65 |

* cited by examiner

EDGE DISPLAY HAVING A LED MATRIX

CROSS-REFERENCE TO RELATED APPLICATION

This application claims priority from U.S. provisional patent application 62/567,562 filed Oct. 3, 2017, the specification of which is hereby incorporated herein by reference in its entirety.

BACKGROUND

(a) Field

The subject matter herein disclosed generally relates to wagering game machines. More particularly, the subject matter disclosed relates to visual enhancements in wagering game machines.

(b) Related Prior Art

The purpose of indicia on paper is to convey information. While this is also true for visual effects in wagering game machines, images and indicia displayed by a wagering game's display device have the additional extremely important purpose of providing or increasing entertainment for the player. If some players are not entertained, they will not play on a wagering game machine. Also, more recently, players have come to expect more entertainment from wagering game devices, for example, those having video displays rather than the older mechanical displays.

Since one of the primary purposes of a wagering game machine is to provide entertainment, there is a major challenge for gaming device manufacturers to develop new games that provides increased entertainment. Players are entertained not only by the risk of a wager but also by attractive, engaging, interesting, fun, new and different visual, audio, and audio-visual effects. For those reasons, the gaming industry is constantly seeking to make advancements in games and in the devices and components on which are played these games. If one views a wagering game machine as only a wagering mechanism, the display or graphical aspect of the wagering game machine may appear to have little value. However, by remembering that a wagering game machine is an entertainment device as well as, or in addition to, a wagering device, the importance of an interesting and exciting graphical display and the technical challenges faced by gaming personnel to develop such displays becomes apparent. Simultaneously, to maintain certain player's interest in a wagering game machine for a significant period of time, the games and the wagering game machines on which they run must be highly interesting, entertaining and enjoyable.

There is therefore a need for continuous improvement and development in the field of wagering game machines.

SUMMARY

According to an embodiment, there is provided a gaming machine comprising a front display having a front surface and a side edge, the gaming machine further comprises an edge display comprising: a mounting body having a lateral edge and a longitudinal surface extending in a longitudinal direction; and a lighting component mounted on the mounting body about the longitudinal surface, wherein, when the edge display is on the gaming machine, the lateral edge of the mounting body is contiguous with the side edge of the edge display and wherein the longitudinal surface and the front surface are flush with each other whereby the edge display forms an extension of the front display.

According to an embodiment, there is provided an edge display on a gaming machine comprising a front display having a front surface and a side edge, the edge display comprising: a mounting body having a lateral edge and a longitudinal surface extending in a longitudinal direction; and a lighting component mounted on the mounting body about the longitudinal surface, wherein, when the edge display is on the gaming machine, the lateral edge of the mounting body is contiguous with the side edge of the edge display and wherein the longitudinal surface and the front surface are flush with each other whereby the edge display forms an extension of the front display.

According to an aspect, the longitudinal surface has a convex shape transversely to the longitudinal direction.

According to an aspect, the lighting component further comprises lighting elements configured as a matrix comprising a plurality of rows extending in the longitudinal direction parallel to each other.

According to an aspect, the lighting elements comprises one of Light-Emitting Diodes (LEDs), Organic Light-Emitting Diodes (LEDs) and Polymer Light-Emitting Diodes (PLEDs).

According to an aspect, the lighting component has an inner face abutting the longitudinal surface.

According to an aspect, the lighting component comprises a wing wall wrapped at least partially over the lateral edge.

According to an aspect, the lateral edge comprises a longitudinal slot to be sled over a coupling component of the gaming machine.

According to an aspect, the display edge comprises a first display unit and a second display unit serially connected to the first display unit.

According to an embodiment, there is provided a gaming machine comprising an edge display and a front display having a front surface and a side edge, the edge display comprising: a lighting component mounted about the side edge of the front display; and a graphics processor providing a visual animation, wherein a first portion of the visual animation is sent for display to the front display and a second portion of the visual animation is sent for display to the edge display, further wherein the second portion of the visual animation is a continuity of the first portion of the visual animation, whereby the edge display forms an extension of the front display.

According to an aspect, the lighting component comprises a printed circuit board and lighting elements mounted to the printed circuit board.

According to an aspect, the lighting elements are configured as a matrix comprising a plurality of rows extending in the longitudinal direction parallel to each other.

According to an aspect, the lighting elements comprises one of Light-Emitting Diodes (LEDs), Organic Light-Emitting Diodes (LEDs) and Polymer Light-Emitting Diodes (PLEDs).

According to an aspect, the gaming machine further comprises a film covering at least part of the front display.

According to an aspect, a first set of display addresses are associated with the front display and a second set of display addresses are associated with the edge display to send the visual animation from the graphics processor to the front display and the edge display.

According to an aspect, the edge display comprises at least two edge displays connected in series.

According to an aspect, the front display comprises a glass cover, wherein the glass cover extends over the edge display.

According to an aspect, a portion of the cover which extends over the edge display comprises a convex shape.

According to an embodiment, there is provided an edge display for mounting about a front display, the front display having a front surface and a side edge, the edge display comprising: a mounting body having a lateral edge and a longitudinal surface extending in a longitudinal direction; and a lighting component mounted on the mounting body about the longitudinal surface, wherein, when the edge display is mounted about the front display, the lateral edge of the mounting body is contiguous with the side edge of the edge display and wherein the longitudinal surface and the front surface are flush with each other whereby the edge display forms an extension of the front display.

According to an aspect, the longitudinal surface has a convex shape transversely to the longitudinal direction.

According to an aspect, the edge display further comprises a display port input for receiving a visual animation from a graphics processor.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
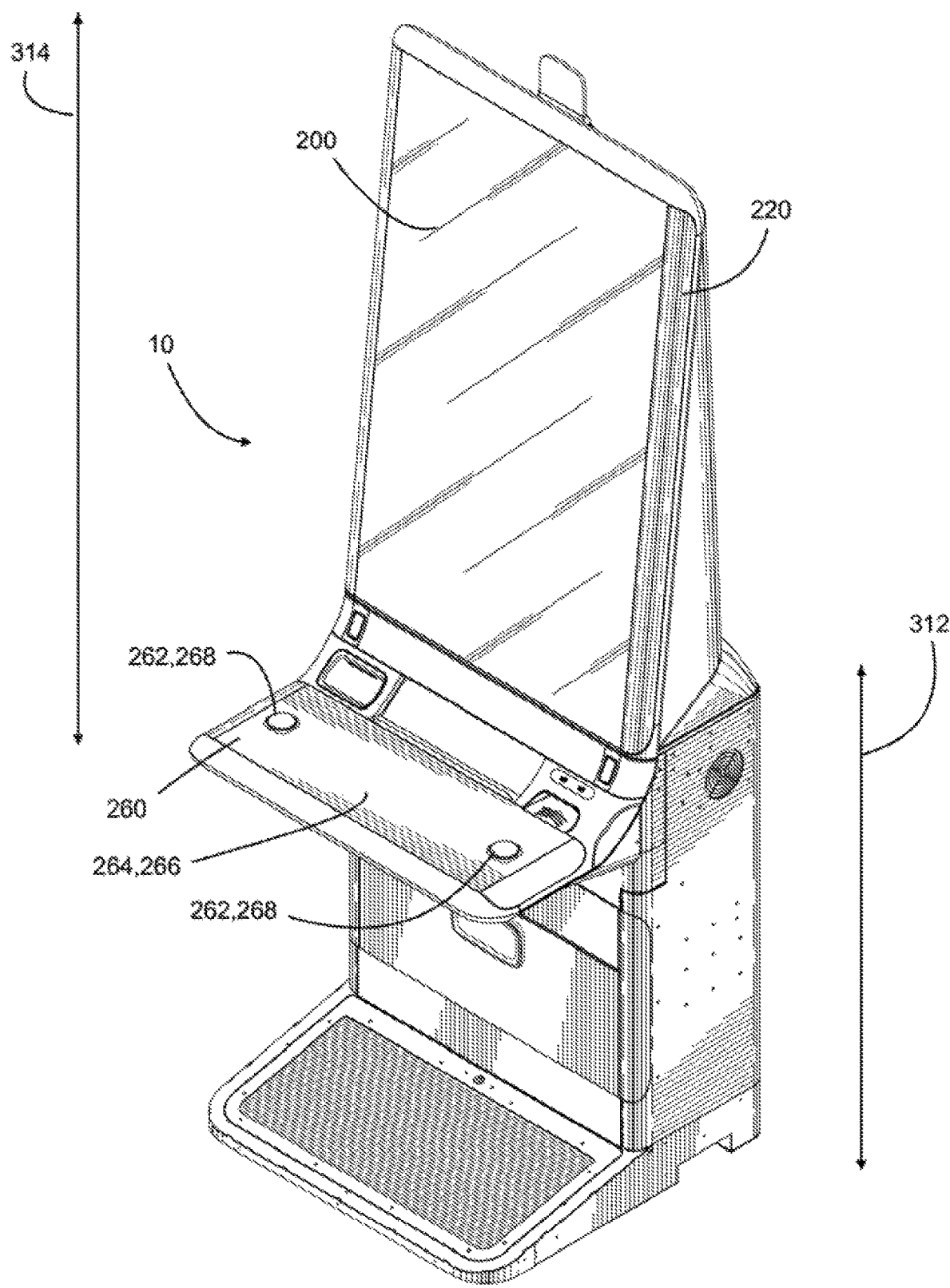
FIG. 1 is a perspective view of a wagering game machine in accordance with an embodiment.

In the present specification, the terms and expressions "gambling", "gambling activities", "gaming activities", "wagering", etc. are meant to refer to any process through which a player places a wager, and according to an outcome generation and evaluation process, a prize value is established and awarded to a player.

The terms and expressions "player" and "patron" mean a person engaged or potentially engaged in a gambling activity.

The terms and expressions "wagering game machine", "gaming machine", "game machine", "gaming terminal", "gaming device", "game device", "gaming table", "player station" etc. are meant to refer to any device adapted to perform gambling services, such that a player may be engaged in a gambling activity through that device.

The term and expressions "game" in relation with gambling activities refers to the presentation of the gambling activity to a player, or interaction in a gaming activity with one or more players. The game may be an instant game that may be resolved instantly, a multi-player game where many players are involved in the gaming activity and wherein the actions of a player may influence the outcome provided to another player, or a game featuring some similar or different characteristics that results in the game fulfilling the above gambling definition.

The terms "monetary value" mean any value exchangeable for goods and services.

The terms "medium" and "media", in relation with monetary value, are meant to encompass any physical or electronic support for monetary values.

Further, in the expression "cross-section shape" refers to a shape according to a cross-section plane perpendicular to the principal direction of the described object, normally the longitudinal direction.

Referring now to the drawings, and more particularly to FIGS. 1 to 6, two embodiments of wagering game machines 10/110 are illustrated.

Figure 2:
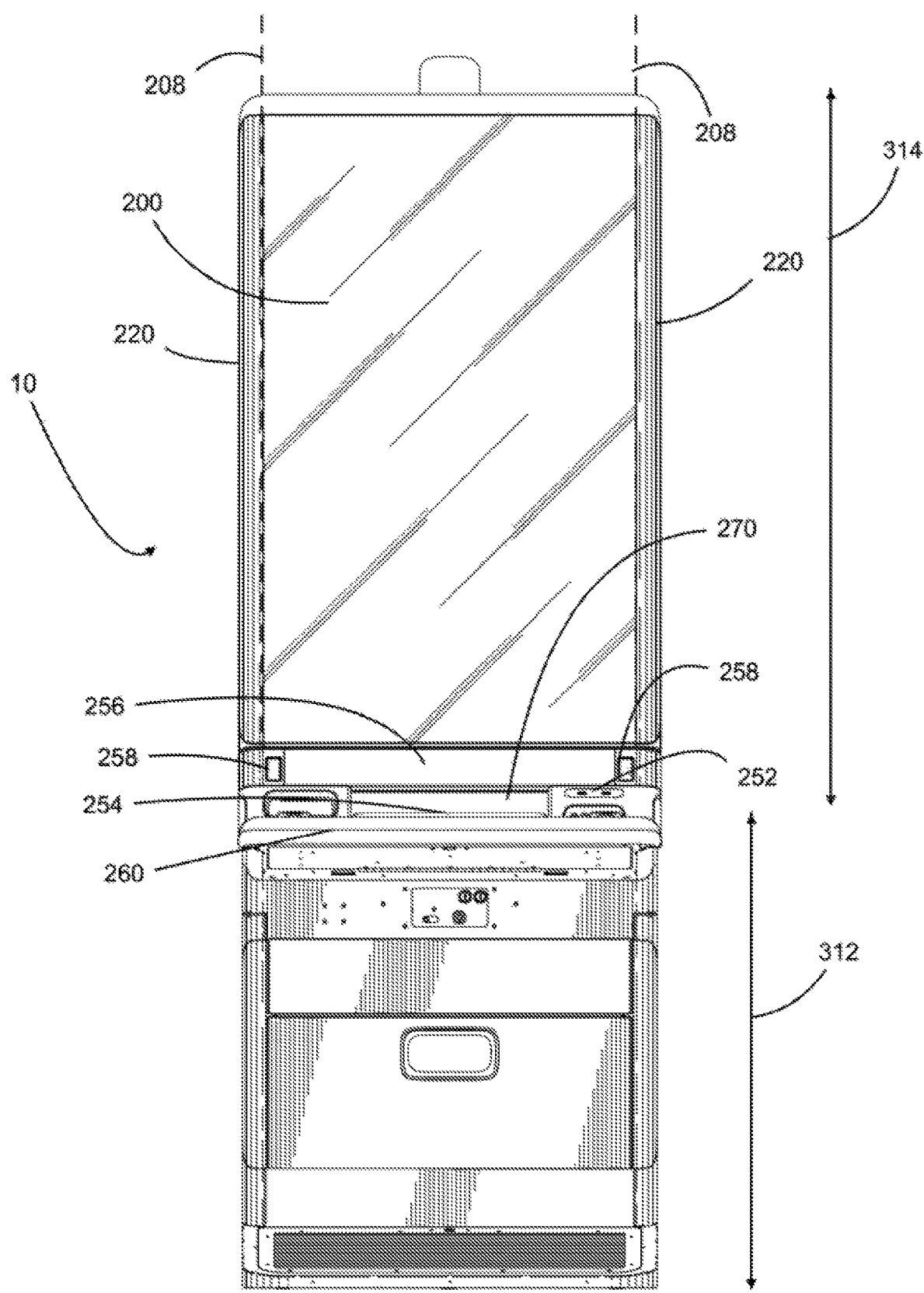
FIG. 2 is a front view of the wagering game machine of FIG. 1.
Figure 3:
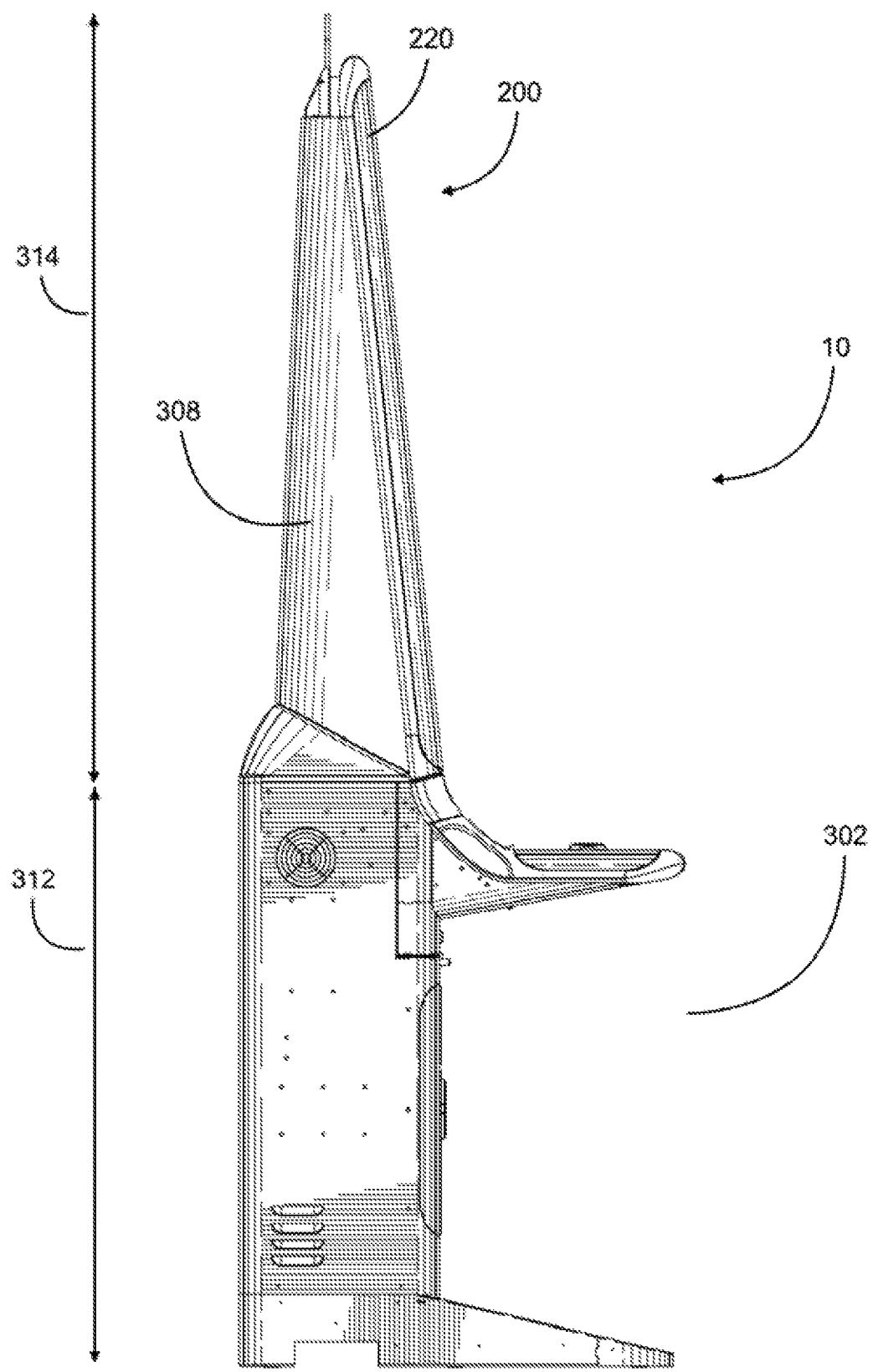
FIG. 3 is a side view of the wagering game machine of FIGS. 1 and 2.
Figure 7:
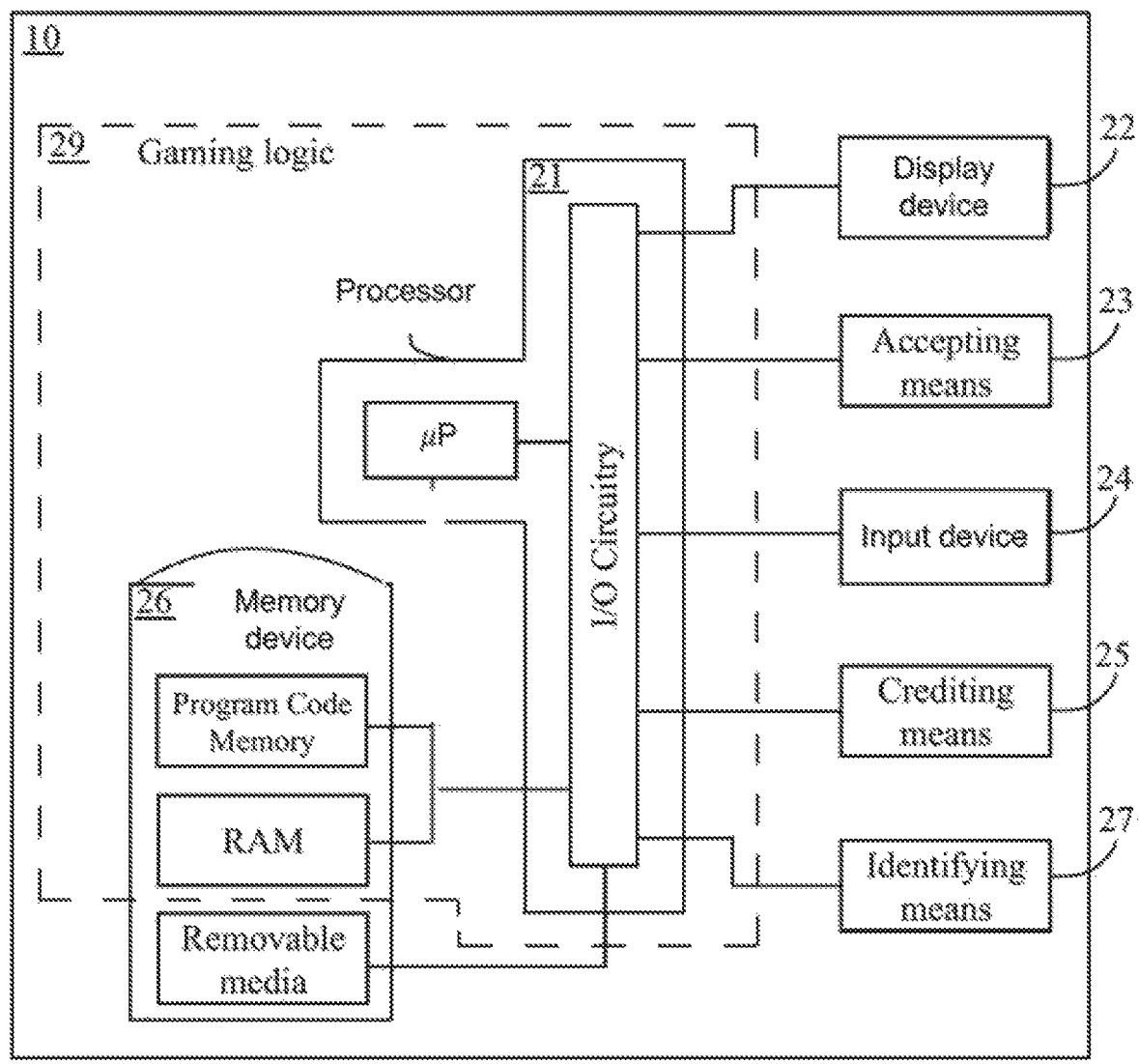
FIG. 7 is a schematic of the components of a wagering game machine in accordance with an embodiment.

Referring particularly to FIGS. 1 to 3 and additionally to FIG. 7, the wagering game machine 10 comprises a gaming machine cabinet 30 having a front 302, a back 304 and sides 308. The wagering game machine 10 comprises a lower member 312 and an upper member 314. The wagering game machine 10 houses hardware components secured inside the gaming machine cabinet 30 in the lower member 312. The wagering game machine 10 also houses other hardware components, mostly to the upper member 314, well secured to the wagering game machine 10 with most of these hardware components interfacing with the environment and the player.

Referring particularly to FIG. 7, the hardware components housed by the lower member 312 comprise memory device 26 functionally connected to the processor 21, display device 22 and input device 24 both also functionally connected to the processor 21. The memory device 26 is partially part of the gaming logic 29 of the wagering game machine 10. Removable media are considered outside the game logic 29.

The processor 21 typically comprises a processing component (a.k.a. a microprocessor) and associated In/Out circuit through which signals are exchanged between the processor 21 and the functionally connected hardware components.

The memory device 26 typically comprises program code memory (e.g. hard drive, Read-Only Memory (ROM)) wherein code processable to perform the wagering game are stored. Random Access Memory (RAM) and optionally removable media are also present or temporarily present in some embodiments. Example of optional removable media is a player club card or other player identification device a hardware component functionally connected to the processor 21 is capable of reading upon insertion or use in relation with the wagering game machine 10.

To play the wagering game, the memory stores data processable as the wagering game comprising steps comprising receiving player inputs, selecting an outcome among potential outcomes and generating visuals, aka visual animations, associated with the outcome, and the processor processes the data and inputs, generates visuals and transmits the visuals to the displays and other output components to provide the game to the players.

Additional optional components frequently present on a wagering game machine 10 comprise accepting means 23, crediting means 25 and identification means 27. The accepting means 23 is for accepting monetary value from a player, that monetary value being embodied as a bank note, an accepted value-bearing token of some sort, or an electronic value transfer. The crediting means 25 is for giving back monetary values to the player, the monetary value being one or a combination of winnings from the game and credits transferred in the game from which account the player desired to perform a withdraw. Both accepting means 23 and crediting means 25 can in some embodiments be present in a plurality of forms, and as a combination (e.g. a note reader and a printer, with the note bearing information related to credit-value). The identification means 27 is for identifying the player interacting with the machine. In some embodiments, the identification means 27 is embodied as a single component embodying both reading/detecting function and displaying function. In other embodiments, the identification means 27 takes advantage of components already present in the wagering game machine 10, for example a card reader and a display. Accordingly, the latter components are possible to be embodied in a series of distinct ways based on desired realizations, these components requiring functional characteristics of player-interfacing components and specific processing. In some cases, they require being in communication with systems remote to the wagering to gaming machine 10.

Referring to FIGS. 1 to 3, the wagering to gaming machine 10 comprises a display device 22 comprising a main display 200 and an edge display 220. The main display 200 is a typically a Liquid Crystal Display (LCD display) and is mainly used to provide the game, namely the information, the animation and the outcome relative to the wagering game.

The wagering game played on the wagering game machine 10 consists in a random process through which an outcome is provided to the player in exchange of a wager. The wagering game, in order to optimize entertainment, comprises a variety of outcomes kept in a pool of outcomes, including losing outcomes and winning outcomes, and special outcomes. The outcomes are provided using animations, with the outcome being provided as a single animation or as a series of animations summing up to the selected outcome, or selected from a distinct special pool of outcomes. Some outcomes are instantaneous, requiring no interaction from the player, and some outcomes require interaction from the player, for instance the selection of icons displayed on the screen, a player input to stop an animation, a variation of a wager specific to that interaction, participation in a multi-player process, or any other decision or input a game designer would use to improve the entertainment value of the game.

In the pool of outcomes, one or more outcomes are special outcomes having special significance to the players, for instance progressives (a.k.a. progressive prizes) which are variable value outcomes having their value increasing as players participate in a game, either locally on the wagering game machine 10 or on any wagering game machine 10 of a pool of wagering game machines sharing a participation in the progressive(s). In other cases, interactive outcomes or multi-player-process triggering outcomes are considered special outcomes. These special outcomes are intended by the game designers to be one of the features that distance their wagering game from the other wagering games of a vicinity. So, the game designers need the occurrence of the special outcomes to be highlighted in some way so that patrons in the vicinity will be aware of the game and be incited to play the game.

Figure 9:
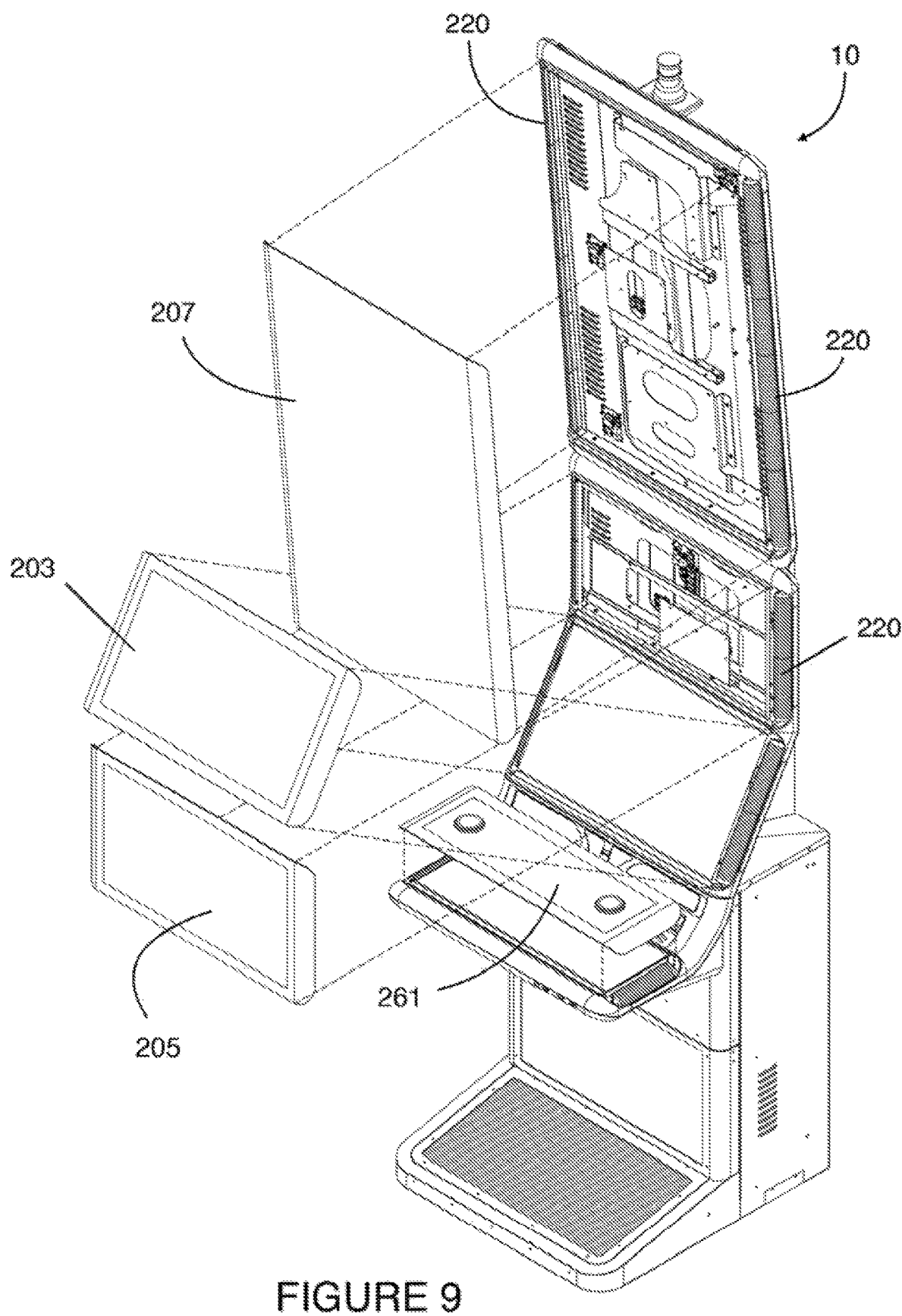
FIG. 9 is a perspective view of the gaming machine of FIG. 4 with the displays exploded from the cabinet.

Back to FIGS. 1 to 3 and in addition referring to FIG. 9, the wagering to gaming machine 10 comprises a main display 200 located at the front 302 of the wagering to gaming machine 10 and facing a player in normal conditions. On both sides of the main display 200 and substantially flush to front surface of the front display 200 are the edge displays 220 that form an extension on both sides of the front display 200. The main display 200 and the edge display 220 are joining on the side of the main display 200 over the whole height of the main display 200 at a side front edge 208.

Not illustrated, based on design, edge displays 220 may also be mounted at the top edge of the gaming machine, or the front edge of the control board 260. Thus, the edge displays 220 may be installed on any front edge, thus anywhere where the front of the gaming machine intersects and any edged face (the top, the sides, the extremity of the control board, etc.), with the use of edge displays 220 on these front edges providing a pleasing design.

On one side of the edge displays 220, the main display 200 and the edge displays 220 abut in a substantially flat fashion to define a continuous front surface having a pleasing effect. On the other side of the edge displays 220, the edge displays 220 abut the edged face (one side 308) also in substantially flat fashion. Thus, the edge displays 220 define with its outer face 412 a fillet or chamfer (depending on the cross-section shape of the edge display 220) for the corresponding front edge 208. Typically, as illustrated, the edge displays 220 have an outwardly curved profile wrapping from the main display 200 to a neighbor side 308 of the wagering game machine 10 to define a lit fillet to the edged front edge 208.

A glass cover 203, 205, 207, 261 (FIG. 9) covers the displays 202, 204, 206, 260 on which a least the control board 260 but in some realizations more displays 202, 204, 206 are mounted with a touch sensitive component. According to one realization, the touch sensitive components consist of a Surface Capacitive (SCAP) located distant from the contact surface of the glass covers 203, 205, 207, 261, but reacting to player contact with the glass covers 203, 205, 207, 261. According to a realization, the glass covers 203, 205, 207, 261 are made of glass, and more specifically of an indium tin oxide (ITO)-type glass which is well adapted for operation characteristics associated with a gaming machine 10. According to a realization, at least one of the touchscreen displays 202, 204, 206, 260 has edge displays 220 disposed on each side, and the glass covers 203, 205, 207, 261 mounted over said touchscreen display 202, 204, 206, 260 extends on both sides over the edge displays 220. Accordingly, in some realizations, a portion of the glass cover 203, 205, 207, 261 extending over the edge display 220 comprises a convex shape.

Figure 10:
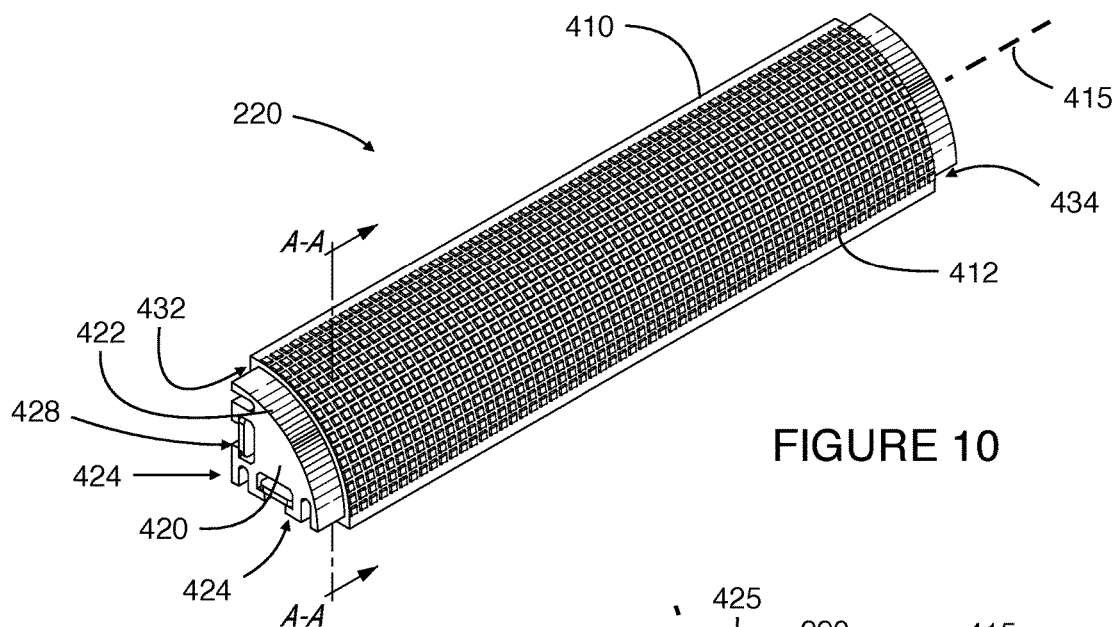
FIG. 10 a perspective view of an edge display as mounted on the gaming machines of FIGS. 1 to 7 and 9.

Referring additionally to FIG. 10, the edge displays 220 comprises lighting components 222 outwardly oriented covered by a film 224 (not visible on FIG. 10 since molded as a cover surface over the lighting components 292). The film 224, according to realizations, is made of a transparent, semi-transparent and/or light-diffusing material for the light emitted by the lighting components 222 to be visible by a patron.

According to a realization not shown, the film 224 comprises a wedging member wedging the film 224 in place over the PCBs 290. The film 224 further has an optic member, for example a thin diffuser film, diffusing light passing through the optic member.

According to a realization (now shown), the film 224 extends from the side edge of the edge display 220 to the front edge of the edge display 220 and potentially beyond. According to realizations, the film 224 extends on the front 302 of the gaming machine 10 over a portion of a front display 200, and potentially over the whole front display 200 extending to the side edge of the opposite edge display 220 located on the opposite side of the gaming machine 10. Thus, the film 224 provides a sense of continuation from one side of the gaming machine 10 to the other, accentuating the aspect of chamfered edge the edge displays 220 provide.

Figure 11:
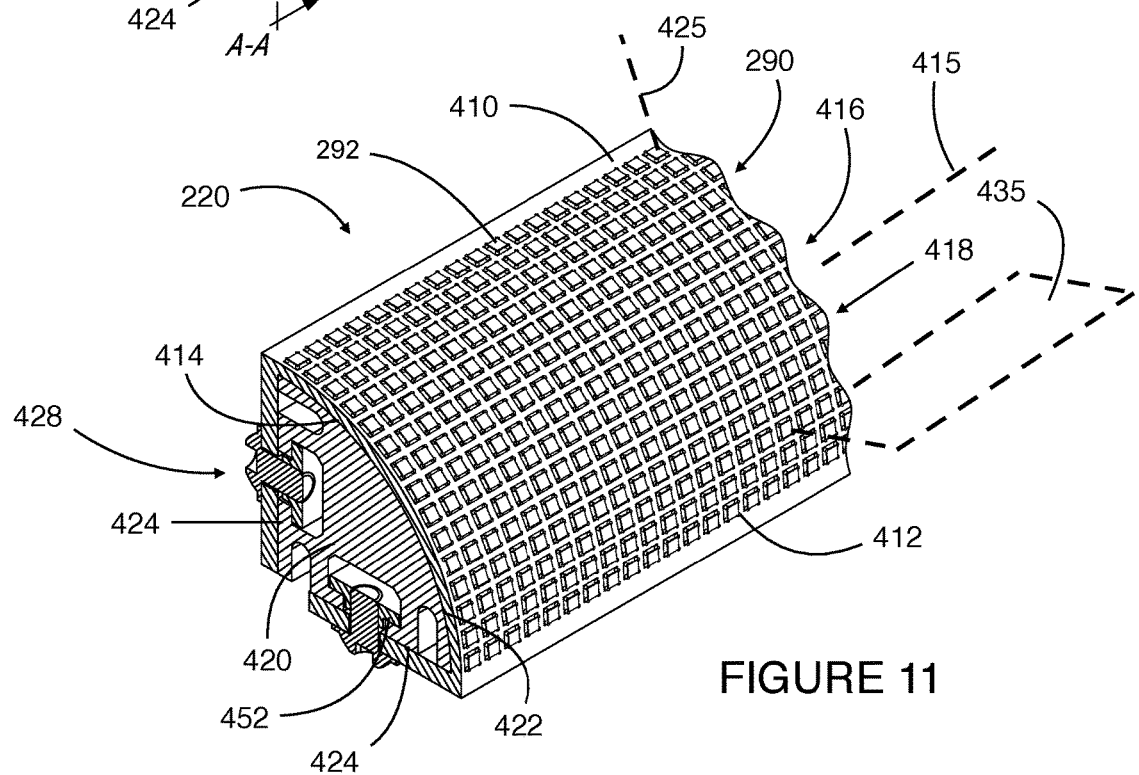
FIG. 11 is a cross-section perspective view along line AA-AA of the edge display of FIG. 10.
Figure 12:
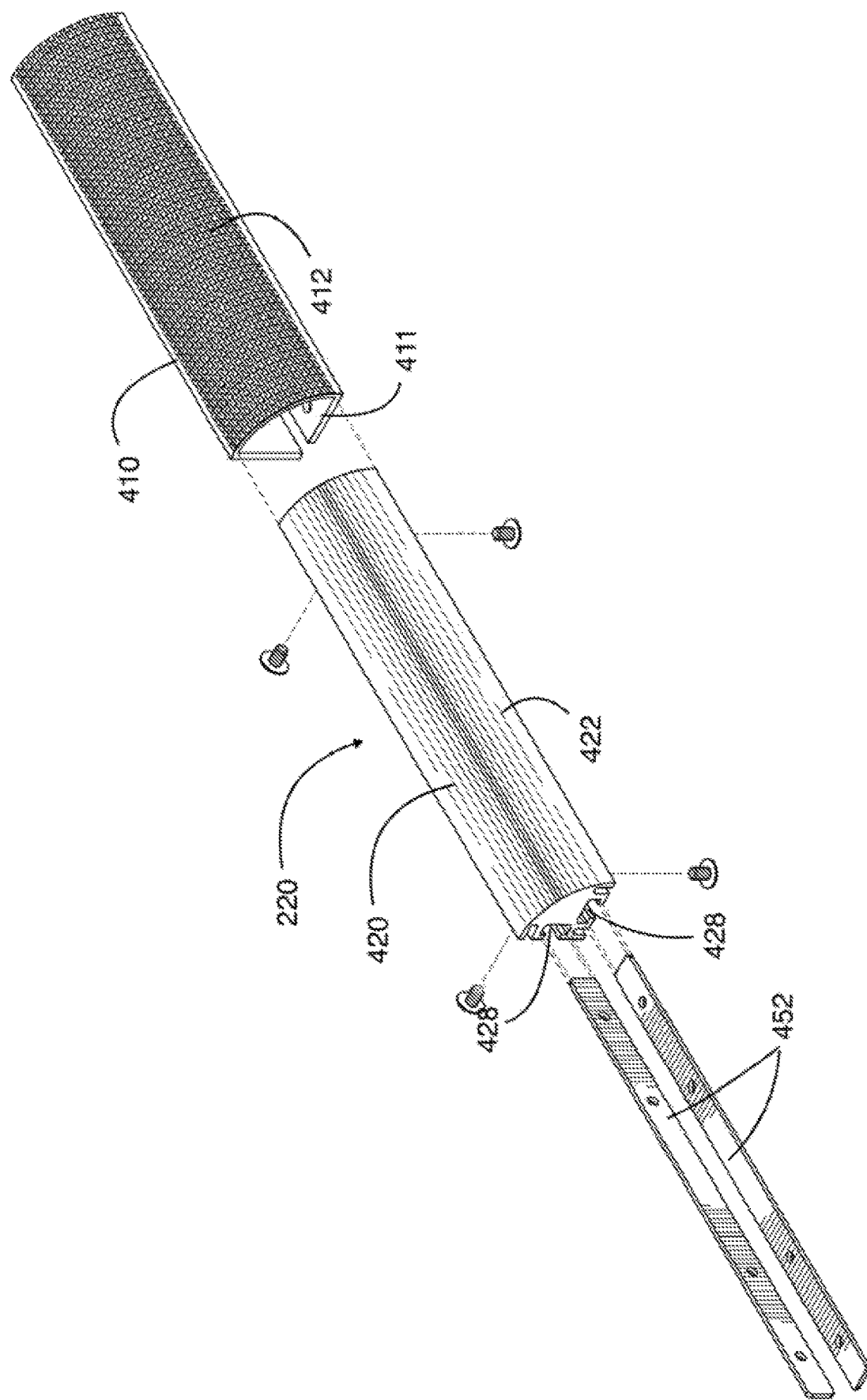
FIG. 12 is an exploded perspective view of the edge display of FIG. 10 with mounting components mounted to the gaming machines.

Referring additionally to FIGS. 10 and 11, each edge display 220 comprises a matrix 416 of lighting components 292 comprising a number of rows 418, typically Light-Emitting Diodes (LEDs). Typically, the number of rows is about sixteen (16). The LEDs 292 are below used as typical lighting components 292 and are therefore used in interchangeable fashion with lighting component 292 in the description below. Other alternative lighting components 292 comprise Organic Light-Emitting Diodes (OLEDs) and Polymer Light-Emitting Diodes (PLEDs).

Back to FIGS. 10 and 11, the rows 418 of LEDS 292 follow the cross-section shape of the edge display 220. Accordingly, the rows 418 are typically parallel to the longitudinal direction 415 of the edge display 220, and define based on their individual general orientation or axis 425, a row plane 435. Row planes 435 of neighboring rows 418 are typically with an acute angle in-between of about six (6) degrees in-between, which may vary from about three (3) degrees when either increasing the number of LEDs 292 par arc degree, increasing the size of the edge display 220 or increasing the arc length of the cross-section arc shape, to over fifteen (15) degrees when decreasing the number of rows 418. Typically, the LEDs are uniformly distributed over the arc shape defining a convex shape with an angle between the row planes 435 about substantially uniformly distributed.

Typically, the first row, aka margin row, of LEDs 292 bordering the edged face is oriented to light up about parallel to a perpendicular axis to the edged face. However, in other realizations, the angle of such a first row may be increased to about fifteen (15) degrees from the edged face perpendicular depending on the desire of define a lit chamfer or a lit fillet to the gaming machine 10.

The LEDs 292 are mounted on a Printed Circuit Board (PCB) 290 as a base of the lighting component 410. The LEDs 292 are individually controllable, since individually addressed as will be discussed below.

The PCBs 290 are designed to be extendable and modular, meaning being possible to operate in desired length and serially connected to one another to extend the length of an edge display 220. Accordingly, the PCBs 290 can be connected in series. The PCBs 290 comprise a powered extremity 432 and a powered extremity, and each PCBs 290 defines a display unit 652/654 (see FIG. 14) as a series of one or more an edge display 220. The powering display unit 652 (or first display unit 652, see FIG. 14) powers and relays communication between the processor 21 and the connected display unit (second display unit 654). Resulting, the processor 21 set a series of display addresses to the first display unit 652 and a second set of display addresses to the second display unit 654 that are sequential to each other as be explained below.

According to a realization, each edge display 220 comprises a number of LEDs 292. According to realizations, the number of LEDs 292 per PCB 290, thus for each display unit 652/654, may vary from twenty (20) to over two hundred (200), based on needs, processing limitations and power management limitations.

The lighting rows 418 are connected to the processor 21 using I2C (Inter-Integrated Circuit) Bus technology, using a single connection between the processor 21 and the edge display 220. According to other realizations, alternative connection technologies are used such as Serial Peripheral Interface (SPI) connection, serial connection, Controller Area Network (CAN) bus, and 1-Wire technology.

The LEDs 292 are controllable independently from each other and controllable according to a series of characteristics. These characteristics comprise the activated/inactive status, their lighting intensity, their lighting color and variations of these characteristics over time allowing to generate patterns and animations. The processor 21 controls individually each LED based on a stored display address for each LED 292. It allows the processor 21 to command independently each of the LEDs 292. The processor 21 stores thus a set of display addresses for an edge display 220, as it stores a set of display addresses for the pixels of the front displays 200.

The processor 21 is further adapted to recognize a new display unit 652/654 to be part of the edge display 220, and to dynamically set and store a set of display addresses for the LEDs 292 of the display unit 652/654, the new set being by default sequential to the set of display addresses stored for the display unit 652 to which the new display unit 654 is connected when such connection is used.

According to a realization, the set of display addresses associated with an edge display 220 are sequential to the display addresses associated with a front display 200. Thus, by connecting a standard oversized display instead of a front display 220 and the edge display 220, a programmer may test the outcome of an animation to be applied on the edge display 220 on the single oversized display.

According to a realization, Unity TM software is used to program the animations to be displayed via the edge displays 220.

Back to the physical aspect, the edge display 220 comprises a mounting body 420 and a lighting component 410 mounted to the mounting body 420. The mounting body 420 comprises substantially three faces outside its longitudinal extremities: a support face 422, aka a longitudinal surface, and two mounting faces 424, aka a couple of lateral edges being mounted contiguous to with the side of the edged display (front display 200). The support face 422 is designed to provide support to the inner face 414 of the lighting component 410. The support face 422 is designed for the inner face 414 to be sled over and abuts at least a portion of the support face 422 to provide support and to help maintain the cross-section shape of the lighting component 410. In a typical realization, the lighting component 410 has a substantially constant thickness, and thus the mounting faces 424, or more precisely the abutting points of the mounting faces 424, have substantially the same cross-section shape as the desired cross-section shape of the edge display 220.

The mounting faces 424 are for mounting the mounting body 420 on the edged faces of the to-be-edged front edge. Each of the mounting faces 424 comprises a longitudinal slot 428. The mounting of the mounting body 420 involves sliding the mounting body 420 over a coupling component 452. In the illustrated realization, the coupling component 452 is an elongated blade mounted to the to-be-hidden edge of the edged faces, for the coupling component 452 to retain the mounting body 420 about the edged faces.

The lighting component 410 comprises wing walls 411 extending inwardly to follow substantially the same angle as the support faces 422 of the mounting body 420. The wing walls 411 are designed to be wrapped about the mounting faces 424 and thus being wedged between the mounted edged faces and the mounting faces 424. This configuration maintains the lighting component 410 in place over the mounting body 420, preventing the lighting component 410 to either slip longitudinally or to move away from the mounting body 420 in a transversal direction.

According to a realization, the wing walls 411 extend substantially over the whole width of the mounting faces 424, and are therefore maintained in place also by the fixation used for mounting the coupling component 452 to the edged face.

In a typical realization, the mounting faces 424 are about ninety (90) degrees from each other, with the wing walls 411 extending also at about the same angle.

According to a realization, the wing walls 411 are made of flexible material, and comprise openings for the fixations used to mount the coupling components 452 to the edged faces to be inserted in openings. In one realization, the wing walls 411 features channels (not shown) connected to the openings, with the channels extending inwardly. The channels allow to slide in-between channel portions of the wing walls 411 between the coupling components 452 once the coupling components 452 being mounted to the edged face.

According to an alternative realization (not shown), the lighting component 410 and the film 224 are distinct components mounted over each other or mounted individually to the mounting body 420. In some realizations, the film 224 is mounted to the lighting component 410 through resilient members or using releasable fixation components. In another realization, the film 224 comprises wings components comprising wing extensions similar to the wing walls 411. In the latter case, the film 224 may be mounted in a similar fashion as the before-described mounting fashion of the lighting component 410, the wing extensions being wedge between the edged face and wing walls 411 of the lighting component 410.

According to embodiment, the nature of the film 224 and the cross-section shape of the film 224 may vary. For instance, optical characteristics and external texture of the film may vary according to the desired experience sought out for the patrons. According to realizations, space may be kept between the inner surface of the film 224 and the LEDs 292 to improve heat dissipation and light reflection and thus homogenization of the light passing through the film 224.

According to a realization, the processor 21 is divided into a plurality of components (not shown), namely a main processor and an add-on processor. In some cases, the main processor takes control of core functions such as the game function, the security and control functions, etc., and of the add-on processor. The add-on processor takes control, under command of the main processor, of non-essential or less-essential components and processes of the wagering game machine 10 such as the edge display. Accordingly, the edge display 220 may be functionally connected to the add-on processor, the latter under control of the main processor.

Figure 14:
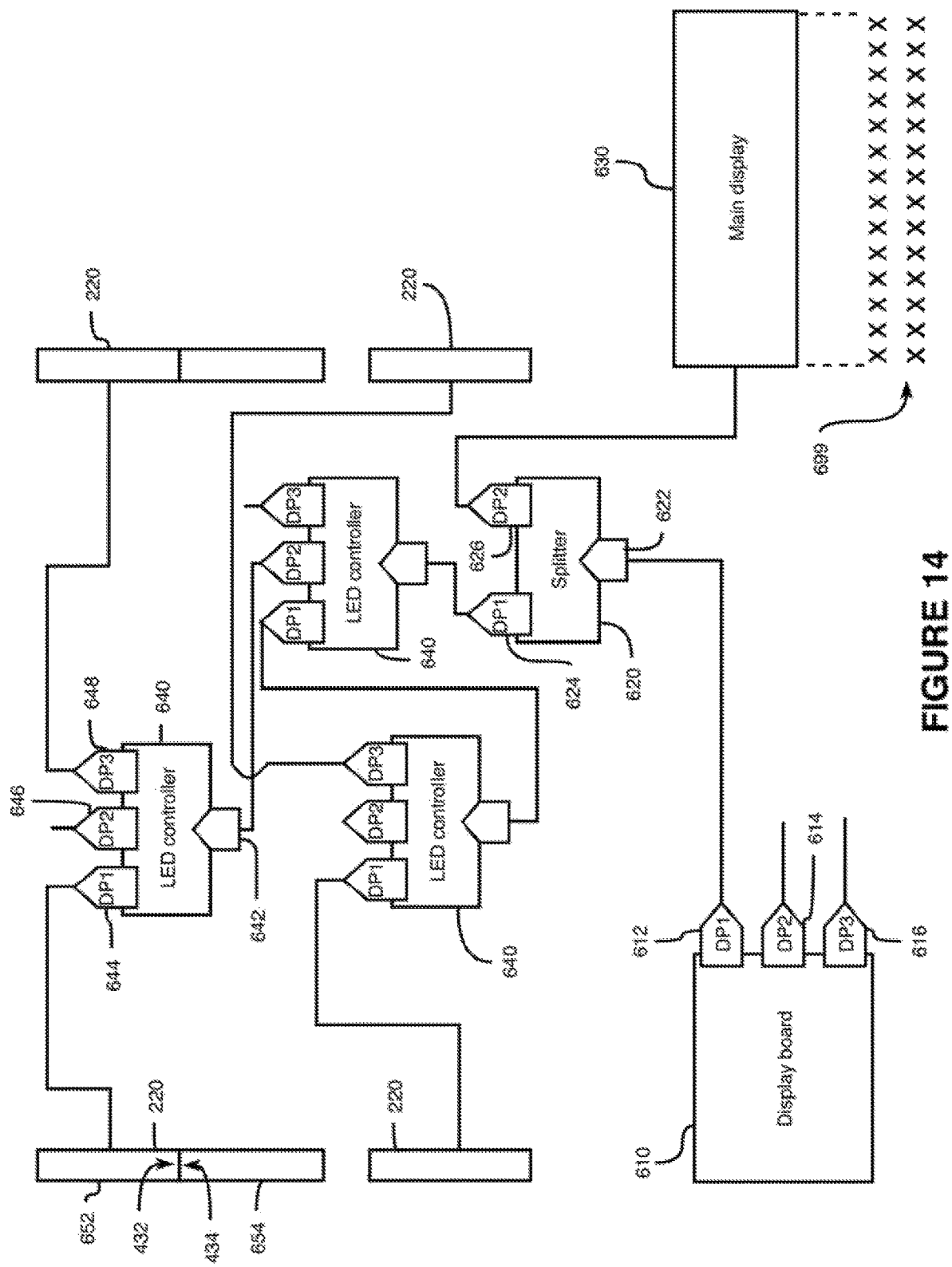
FIG. 14 is an electric schematic of the electrical components involved in display process in the gaming machine.

Referring to FIG. 14, the electric schematic of the electrical components involves in the display process comprises a display board 610 housing the processor 21 (not shown). The display board comprises a series of display ports 612, 614, 616 connected to displays. The display board 610 is connected to a splitter 620 through an input port 622. The splitter 620 comprises a series of display ports 624, 626 to which signals are directed based on associated display addresses. One of the display ports 626 of the splitter 620, as other display ports 614, 616 of the display board 610, may be connected to a front display 630, such as the display 200 of FIG. 1. The display port 624 is further connected to an input port 632 of a LED controller 640. The LED controller 640 is dedicated to managing edge display(s) 220. The LED controller comprises display an input port 642 and ports 644, 646, 648 connected to either the input port 642 of another LED controller 640 or an edge display 220 comprising one or more display units 652/654. This architecture allows to manage a number of edge displays 220 and display units 652/654 by either increasing the number of LED controllers 640 or increasing the number of display units 652/654 per edge display 220.

Thus, the display board 610, and more precisely a graphics processor is adapted to provide a visual animation, wherein the graphics processor sends a first portion of the visual animation for display to the front display 200 using the associated addresses and sends a second portion of the visual animation for display to the edge display 220. Consequently, from configuration of the gaming machine 10 and of the processing capabilities of the gaming machine 10, the second portion of the visual animation is displayed as a continuity of the first portion of the animation, whereby the edge display 220 forms an extension of the front display 200.

It must be noted that the LED controllers 640, as the splitter 620, manages display signals and power. The difference resides in the LED controllers 640 being dedicated to the type of displays that are the edge displays 220.

It must further be noted that pixel representations 699 are illustrates below the display 630. These pixel representations 699 are representation of the outcome of signals transmitted to the edge displays 220 if displayed on the main display 630 or if also displayed in a hidden section of the main display 630. Since the display addresses associated with the edge displays 220 are typically sequential to the display addresses associated with a main display 630, the image displayed on the main display 630 would be virtually extended to comprises the pixels of the edge displays 220.

Figure 13:
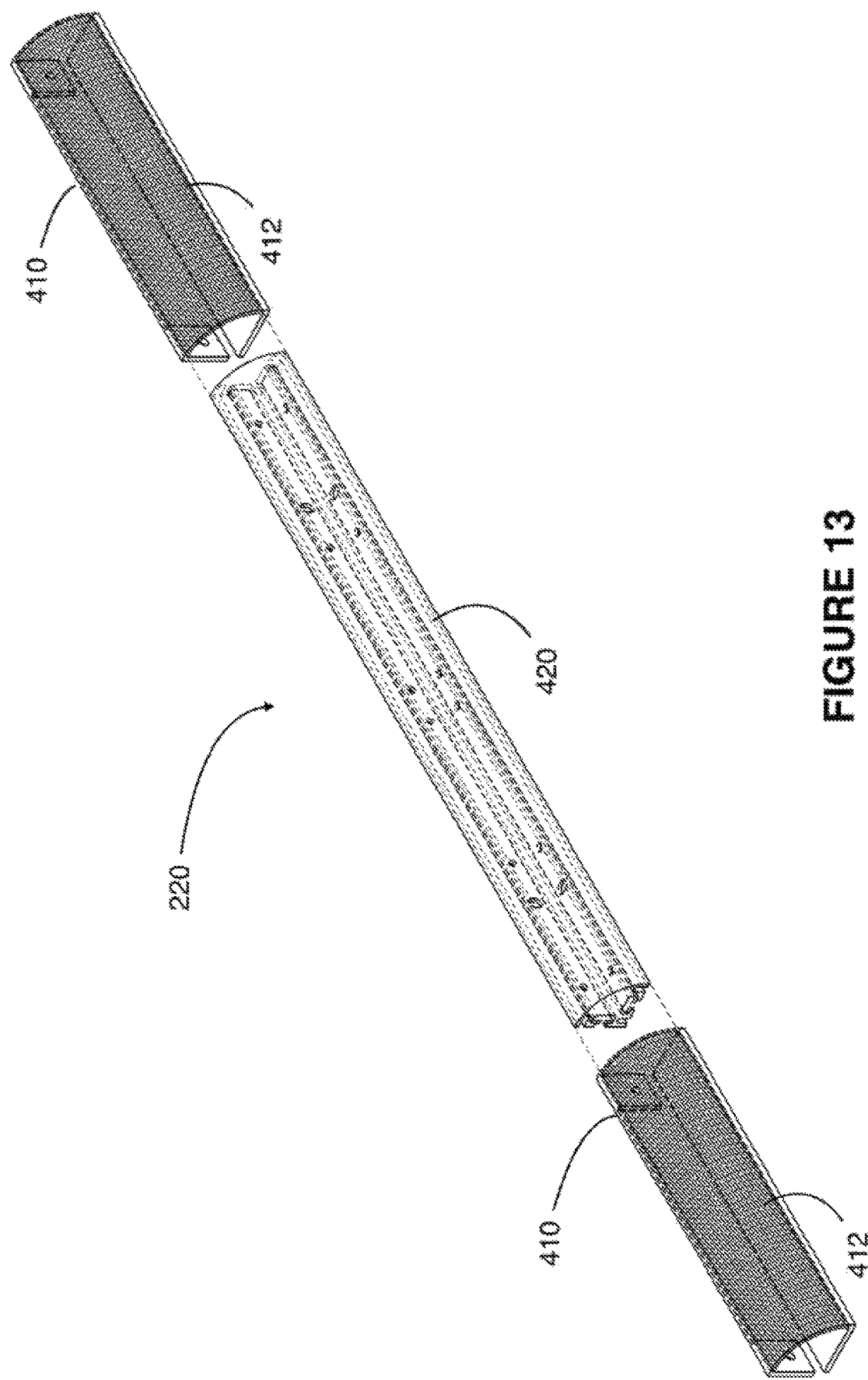
FIG. 13 is a transparent view of the edge display of FIG. 10.

It must be further be noted that that the expression "display board" used in relation with FIG. 13 is a non-limitative expression intended to cover both a main board and a display-signal processing board dedicated to processes relative to display functions, such as signal transmission, display power management, display state control, etc.

Figure 8:
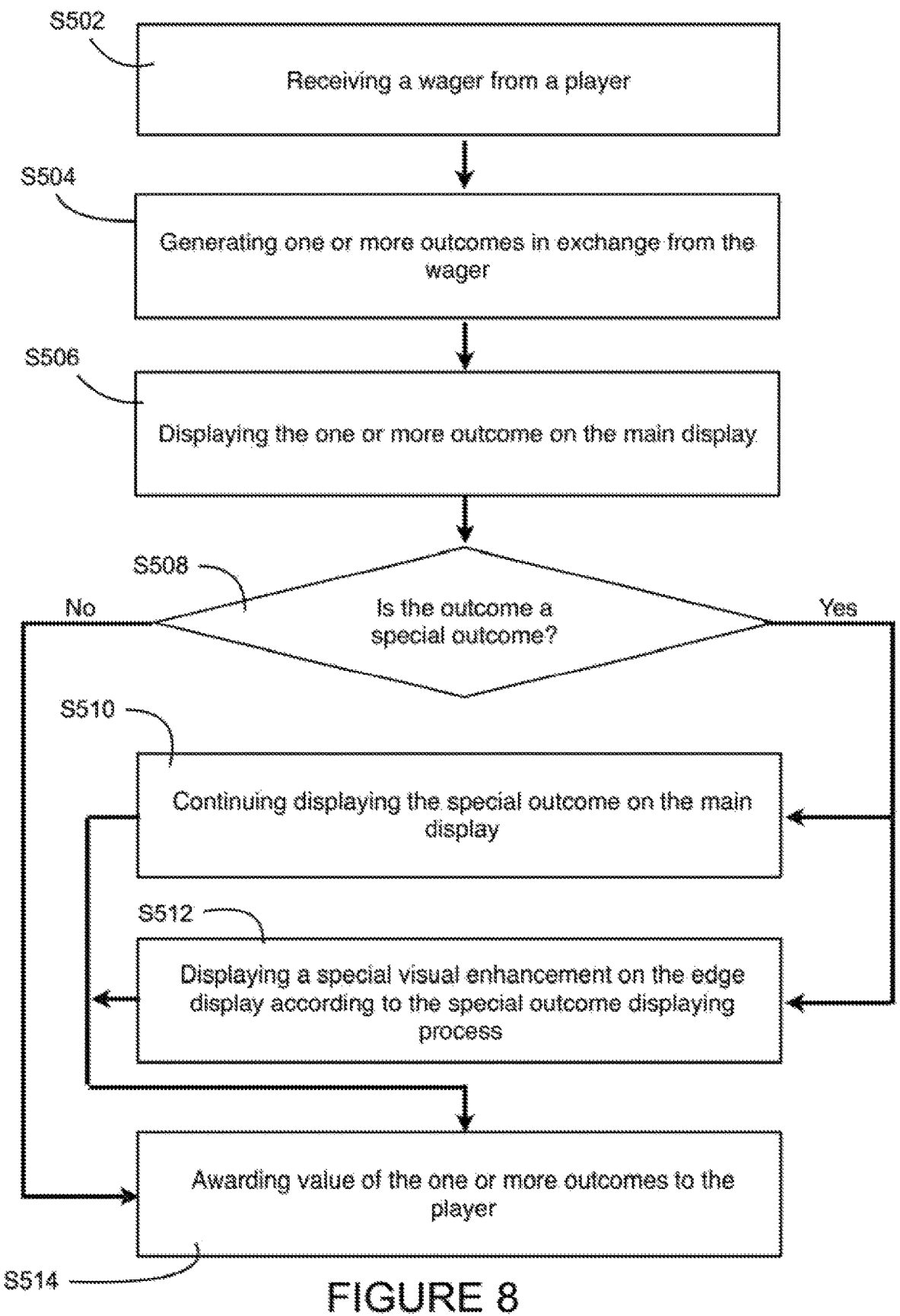
FIG. 8 is a flow chart of steps performed a wagering game machine in accordance with an embodiment.

Referring additionally to FIG. 8, the processor 21, upon occurrence of a special outcome, is adapted to provide signals to the lighting components 222, and more specifically to the lighting rows to perform lighting functions. For instance, upon occurrence of a special outcome, an animation pattern can take place on the edge displays 220 with the color of the LEDs being selected to match or complement the nature of the animation provided on the main display 200. Furthermore, an animation on the edge displays 220 also matches the animation displayed on the main display 200.

Accordingly, steps performed by the wagering game machine 10, 110 can be summarized as follow:

At step S502, the step comprises receiving a wager from the player. As explained in relation with the accepting means, many forms may be available for the wager, from physical components to electronic components and data.

At step S504, the step comprises generating one or more outcomes in exchange from the wager. That step involves the withdrawal of the wager value from a player account local to the wagering game machine 10/110, and selecting an outcome to be provided to the player among a pool of outcomes. One must understand that pool of outcomes should have a broad meaning from a random selection of an element, random selection of a plurality of elements that combined together define the outcome, and/or a process of comparison of at least one random element with another comparison element to determine the outcome. Accordingly, outcomes may be instantaneous, or may involve player's participation or a plurality of players as examples.

At step S506, the step comprises displaying the one or more outcomes on the main display 200. That step usually involves displaying information and animation. In some cases, the outcome may involve a series of animations provided one after the other and summing up as the outcome. Displaying the game outcome on the main display may further comprises displaying a portion of the game interface (e.g. the outcome generation animation) on a first display component (e.g. the lower display 202, FIGS. 4-6) and displaying a second portion of the game interface, (e.g. the paytable) on a second display component (e.g. the central display 204, FIGS. 4-6). Accordingly, one should understand that the step of displaying an outcome may take many forms depending on the game, the game environment, etc.

At step S508, the step comprises evaluating if the outcome is a special outcome.

At step S510, the step comprises, in case of a special outcome, to display the special outcome on the main display 200.

At step S512 which is performed at the same time as S510, the step comprises, in case of a special outcome, to display a special visual enhancement on the edge displays 220 according to the special outcome display process.

Steps S506, S510 and S512 end with step S514. Step S514 comprises awarding the outcome value of the one or more outcomes to the player. As with step S502, step S514 may take many forms based on the components of the wagering game machine 10/110 and based on systems with which the wagering game machine 10/110 communicate.

Figure 4:
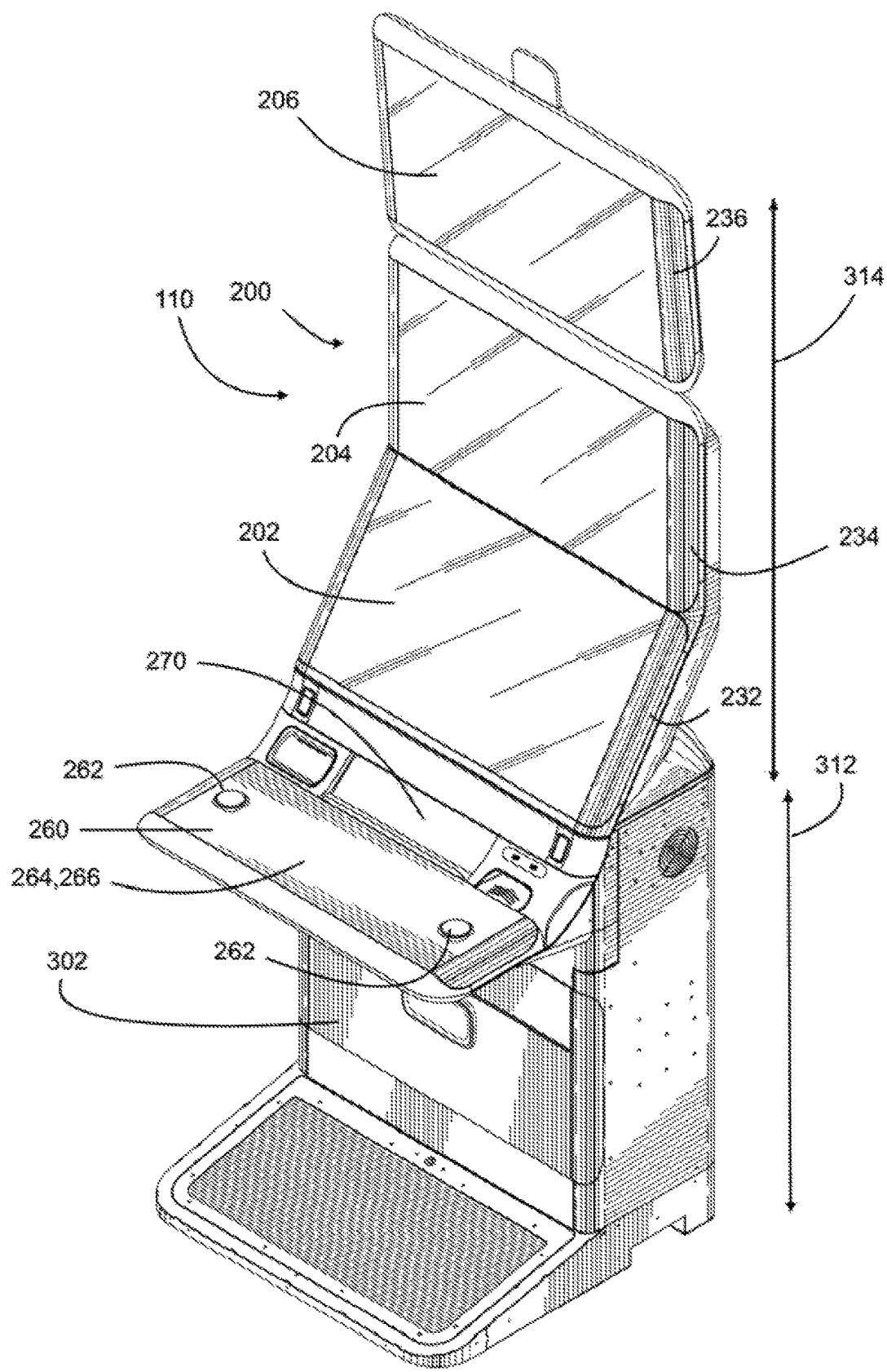
FIG. 4 is a perspective view of a wagering game machine in accordance with another embodiment.
Figure 5:
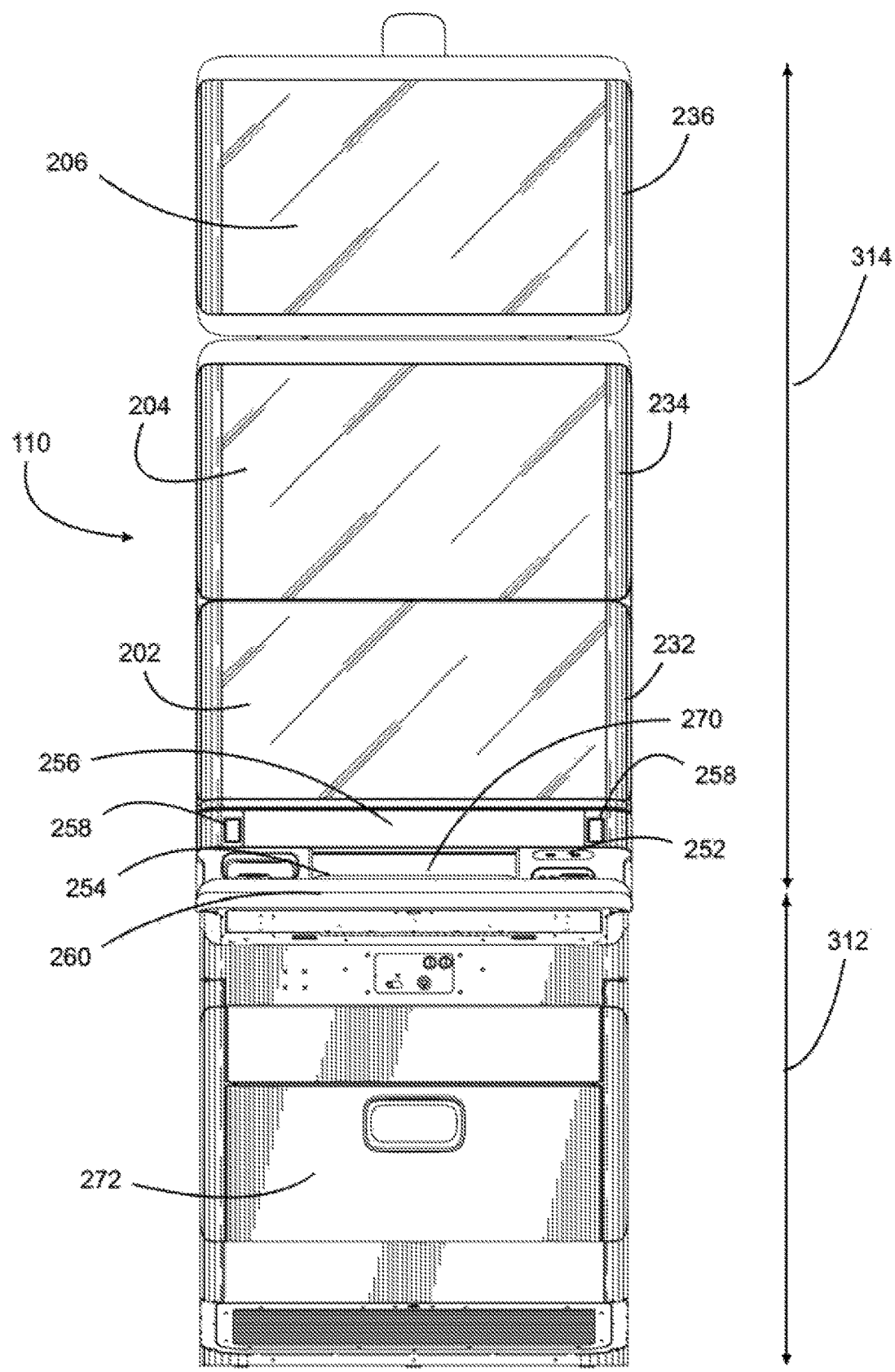
FIG. 5 is a front view of the wagering game machine of FIG. 4.
Figure 6:
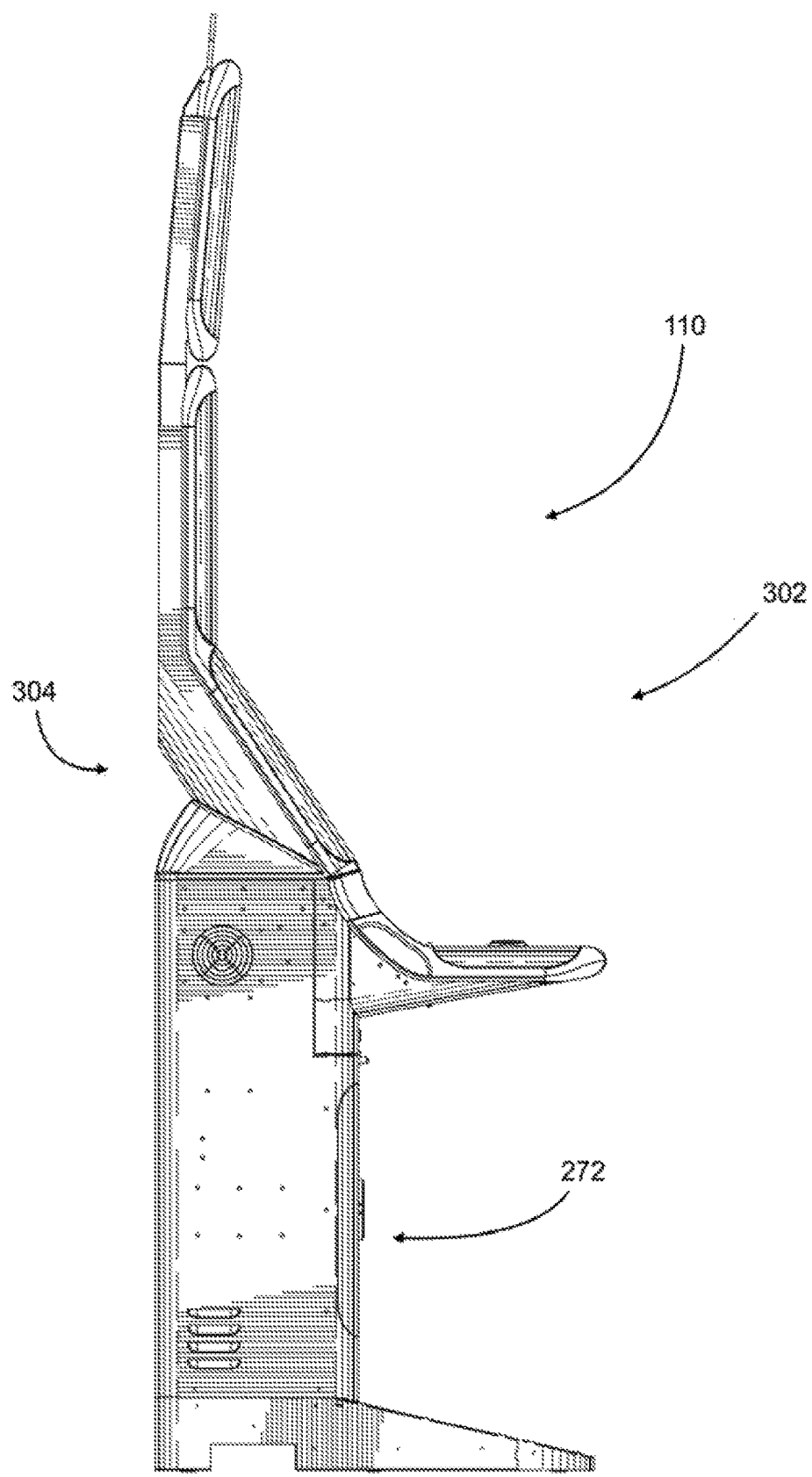
FIG. 6 is a side view of the wagering game machine of FIGS. 4 and 5.

Referring particularly to FIGS. 4 to 6, a realization of the wagering game machine 110 comprises a main display 200 comprising a plurality of distinct display components, namely a lower display 202, a central display 204 and an upper display 206 each functionally connected to the processor 21. The edge display 220 comprises also a plurality of edge display components, namely a lower edge display 232, a central edge display 234 and an upper edge display 236. The main displays (202, 204, 206) join the edge displays (232, 234, 236) along a boundary line with the joint between the side-by-side displays (202/232, 204/234, 206/236) providing a substantially continuous surface. The edge displays (232, 234, 236) wrap from the main displays (202, 204, 206) to the corresponding component of the sides 308. Each edge display (232, 234, 236) comprises a series of lighting rows (adapted relative to the length of the boundary line). Each lighting row is functionally connected to the processor 21.

Referring back to FIGS. 1 to 6, the wagering game machines 10/110 comprise a lower member 312 and an upper member 314. The wagering game machines 10/110 are designed as a modular device. The lower member 312 comprises the part of the gaming machine cabinet 30 housing the components that need to be secured out of reach of a patron. The upper member 314 is customizable to adapt to the clientele. Wagering game machines 10/110 embody examples of customization, including the size and number of displays components part of the main display 200, the configuration of the main display components, the presence, nature and configuration of additional display components such as, without limitation, edge displays, horizontal lighting components, customizable advertising components, candle light, etc. Games are designed to specific configurations, and/or processable code comprises code specific to a plurality of configurations, with the processor 21 selecting the correct code to process based either on recognition of the displays (using plug and play technology for instance) and/or based on manually entered configuration.

The lower member 312 comprises additional components, such as without limitation, overheating fans, speakers, input devices 24, lockable interior-cabinet door, and lighting components.

Connection between components housed by the upper member 314 and the lower member 312 is provided through cables passing in an enclosure located behind the main display 200 both providing structural robustness to support the main display 200 and other upper member components and proving a closed area for these cables to go through, preventing them thus to be handled by non-authorized individuals.

Joining the lower member 312 to the upper member 314 is a rear lighting wedge 240. The rear lighting wedge 240 wraps the sides 308 and the back 304 of the lower member 312 with the rear and back of the upper member 314, substantially at the base of the lowest component of the main display 200. The rear lighting wedge 240 is functionally connected to the processor 21 for control. The lighting components of the rear lighting wedge 240 are facing substantially upward and backward to provide a lighting ambiance in the vicinity of the wagering game machine 10/110.

The rear lighting wedge 240 is further adapted to by applied on its external surface a film providing advertising on the maker of the gaming machine cabinet 30, the game designer, the game distributer, the game title and/or the vicinity in which the wagering gamine machine 10/110 is operating.

Advantages associated with the rear lighting wedge 240 comprise the emitted light providing a "floating feeling" associated with the wagering game machines 10/110, better visibility when the wagering game machines 10/110 is installed side by side with other wagering game machines in the vicinity, better perception of the thickness of the wagering game machines 10/110, and acts as cover for the physical attachments used to secure the upper member 314 to the lower member 312.

The wagering game machines 10/110 also comprise in the front 302 Universal Serial Bus ports (USB ports 252—FIGS. 2 and 5). According to a realization, the USB ports 252 are functionally connected to a power source allowing a player to recharge their phone or other personal small electronic device during a play session.

According to a realization, the USB ports 252 are functionally connected to the processor 21, capable of exchanging data with the processor 21 such as accessing Internet through the wagering game machine 10/110. According to a realization, the processor 21 is adapted to exchange data according to a specific app installed on the player's device. Accordingly, the personal device physically connected to one USB port 252, through that app, may operate as a proxy extending the playing capability of the wagering game machine 10/110, for instance by displaying animation and receiving input from the player.

According to a realization, the USB port 252 are usable for transfer secured data to the processor 21. The transfer is performed using a secured protocol and is further secured through device identification by a secured server. The transfer allows access to configuration of the wagering game machine 10/110 and/or allows download of configuration data into the wagering game machine 10/110.

The wagering game machines 10/110 further comprise a personal device rail 254 (FIGS. 2 and 5) at the rear end of a control board 260. The personal device rail 254 acts as a stand for phones and other player's personal devices. The personal device rail 254 consists of a wide upward bump appropriately located for the device to be placed on or beyond the bump leaned over the front 302 of the wagering game machine 10/110. The personal device becomes thus slightly sloped, facing front and upward relative to the wagering game machines 10/110.

The wagering game machines 10/110 further comprise a speaker bar 256 and two control buttons 258 (FIGS. 2 and 5) integrated into a horizontal feature at the top end of the lower member 312. The location and configuration provide the sound box area necessary to provide high quality sound to the player. The location of the control buttons 258, normally associated with cash-out function and service function, are ideally for easy recognition from players as to prevent accidental pushing of the buttons 258.

It must be noted that, in a typical realization, the speaker bar 256 and the control buttons 258 are integrated with a contrasting color to feature visually as a horizontal stripe. The speaker grille is preferably made of metal with a small diameter continuous through hole grid.

The wagering game machines 10/110 further comprise a control panel blanking display 270 located between the rear end of the control board 260 and the speaker bar 256. The control panel blanking display 270 is for displaying information to the player provided by a remote player tracking system or an advertising system for instance. The control panel blanking display 270 is functionally connected to the processor 21.

The control panel blanking display 270, according to a realization, operates as a player tracking display, being functionally connected to a player tracking system (not shown) remote from the wagering game machine 10/110. Alternative remote systems may connect to the control panel blanking display 270 to provide a variety of experience and interactions to the player, from player tracking, membership, account management, advertising, vicinity provided rewards, etc. Functions are based on local processable data and/or functions of remote connected systems.

According to embodiments, other input/output components may also operate in relation with remote systems to feed these systems with data and provide players with information based on data received from one such remote system. Examples of other components comprise card reader, ticket reader, ticket printer, lighting system, etc.

The wagering game machines 10/110 further comprise a lighting belly glass 272 located at the front 302 under the control board 260. As other lighting components of the wagering game machine 10/110, the belly glass 272 is controlled by the processor 21 and may bear an advertising film. Lighting effects applicable on the belly glass 272 comprise, as examples, surrounding illumination, heart-beat lighting effect, gradient lighting, etc. As other display components, the belly glass 272 preferably wraps around the wagering game machine 10/110 from one side 308 to the other side 308, providing a rounded design matching the other display components of the wagering game machine 10/110.

According to embodiments, image capture or light level detection is used to monitor environment. According to algorithms, lighting components are operating in different modes based on, for instance, the presence of players in front of the wagering game machine 10/110, the darkness of the vicinity, and/or the period of the day for examples.

The wagering gaming machines 10/110 further comprise a control board 260 on which most of the controls usable by a player to play the game are located. The control board 260 is located substantially at the top of the lower member 312 of the wagering gaming machines 10/110, below the main display 200, the speaker bar 256 and the control panel blanking display 270. It extends forward, leaving leg space under, and over the width of the wagering gaming machine 10/110. Controls are mounted on its display surface 265 (see FIG. 4), providing an ergonomic configuration.

One must note that the description of the gaming machine 10/110 before used is for teaching purpose only, and even though a number of components have been described, other realizations of gaming machines featuring a different number of components, namely additional components or free of some described components are intended to be encompassed in the present description, with the minimal components being defined solely by the appended claims.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. An edge display on a gaming machine comprising a front display having a front surface and a side front edge, the edge display comprising:
   a mounting body having a lateral edge and a longitudinal surface extending in a longitudinal direction; and
   a lighting component mounted on the mounting body about the longitudinal surface, wherein the lighting component comprises a wing wall and an outer face,
   wherein, when the edge display is on the gaming machine, the wing wall is contiguous with the side front edge and wherein the outer face and the front surface are flush with each other at an intersection of the wing wall and the outer face whereby the edge display forms an extension of the front display.

2. The edge display of claim 1, wherein the longitudinal surface has a convex shape transversely to the longitudinal direction.

3. The edge display of claim 1, wherein the lighting component further comprises lighting elements configured as a matrix comprising a plurality of rows extending in the longitudinal direction parallel to each other.

4. The edge display of claim 3, wherein the lighting elements comprises one of Light-Emitting Diodes (LEDs), Organic Light-Emitting Diodes (LEDs) and Polymer Light-Emitting Diodes (PLEDs).

5. The edge display of claim 1, wherein the lighting component has an inner face abutting the longitudinal surface.

6. The edge display of claim 1, wherein the lighting component comprises a wing wall wrapped at least partially over the lateral edge.

7. The edge display of claim 1, wherein the lateral edge comprises a longitudinal slot to be sled over a coupling component of the gaming machine.

8. The edge display of claim 1, wherein the display-edge display comprises a first display unit and a second display unit serially connected to the first display unit.

9. A gaming machine comprising the edge display of claim 1, the edge display comprising:
 a graphics processor providing a visual animation, wherein a first portion of the visual animation is sent for display to the front display and a second portion of the visual animation is sent for display to the edge display, further wherein the second portion of the visual animation is a continuity of the first portion of the visual animation.

10. The gaming machine of claim 9, wherein the lighting component comprises a printed circuit board and lighting elements mounted to the printed circuit board.

11. The gaming machine of claim 10, wherein the lighting elements are configured as a matrix comprising a plurality of rows extending in the longitudinal direction parallel to each other.

12. The gaming machine of claim 9, wherein the edge display comprises at least two edge displays connected in series.

13. The gaming machine of claim 12, wherein the graphics processor is adapted to dynamically set and store a set of display addresses for the at least two edge displays connected in series, wherein a set of display addresses for a second one of the at least two edge displays connected in series are by default sequential to a set of display addresses stored for a first one of the at least two edge displays connected in series.

14. The gaming machine of claim 9, wherein the front display comprises a glass cover, wherein the glass cover extends over the edge display.

15. The gaming machine of claim 14, wherein a portion of the glass cover which extends over the edge display comprises a convex shape.

16. The gaming machine of claim 9, further comprising a display port providing the visual animation from the graphics processor to both the front display and the edge display.

17. The gaming machine of claim 9, wherein a first set of display addresses are associated with the front display and a second set of display addresses are associated with the edge display to send the visual animation from the graphics processor to the front display and the edge display.

18. The gaming machine of claim 17, wherein the first set of display addresses and the second set of display addresses are sequential to each other.

19. An edge display for mounting about a front display, the front display having a front surface and a side front edge, the edge display comprising:
 a mounting body having a longitudinal surface extending in a longitudinal direction; and
 a lighting component mounted on the mounting body about the longitudinal surface, wherein the lighting component comprises a wing wall and an outer face,
 wherein, when the edge display is mounted about the front display, the wing wall is contiguous with the side front edge and wherein the longitudinal surface and the front surface are flush with each other at an intersection of the wing wall and the outer face whereby the edge display forms an extension of the front display.

20. The edge display of claim 19, wherein the longitudinal surface has a convex shape transversely to the longitudinal direction.

* * * * *